United States Patent [19]
Blose et al.

[11] Patent Number: 5,330,239
[45] Date of Patent: Jul. 19, 1994

[54] PIPE COUPLING

[75] Inventors: Thomas L. Blose, Houston, Tex.; David L. Britten, Calgary, Canada; Kevin J. Humphreys; Trent M. V. Kaiser, both of Edmonton, Canada

[73] Assignee: IPSCO Enterprises Inc., Wilmington, Del.

[21] Appl. No.: 770,566

[22] Filed: Oct. 3, 1991

Related U.S. Application Data

[63] Continuation-in-part of Ser. No. 467,620, Jan. 19, 1990, abandoned.

[51] Int. Cl.$^5$ ............................................. F16L 25/00
[52] U.S. Cl. ................................... 285/328; 285/334; 285/334.4
[58] Field of Search ...................... 285/334, 334.4, 320

[56] References Cited

U.S. PATENT DOCUMENTS

| | | |
|---|---|---|
| 2,893,759 | 7/1959 | Blose . |
| 3,224,799 | 12/1965 | Blose et al. ........................ 285/334 |
| 4,736,967 | 4/1988 | Mott et al. . |
| 4,830,411 | 5/1989 | Tsuru . |

FOREIGN PATENT DOCUMENTS 2116276 9/1963 United Kingdom .

OTHER PUBLICATIONS

Paper: "Investigation of a Premium Casing Connection for Canadian Thermal Recovery Wells" by M. W. Slack et al. dated May 2, 1988.

Primary Examiner—Dave W. Arola
Attorney, Agent, or Firm—Robert H. Barrigar

[57] ABSTRACT

A pipe coupling or connection comprises a female coupling component and a mating male coupling component. Each component is matingly threaded for coupling engagement, and each is provided with an adjacent frusto-conical sealing surface. The sealing surface is provided with a controlled surface roughness, viz. very shallow fine surface variations, preferably formed as microgrooves at a pitch small relative to the pitch of the threads. The slope of the frusto-conical surface of the sealing area of the male component is slightly mismatched with that of the sealing area of the female component to simulate the bearing force vs. axial distance characteristic of shrunk-fit circular cylindrical sealing surfaces. The slight mismatch enables the sealing pressure to be above a design minimum throughout the entire sealing area yet higher at each end of the sealing area. As the coupling is assembled, thread interference in the vicinity of the sealing surface lags the occurrence of interference between the sealing surfaces. Load threads are provided with negatively inclined load flank faces. The slope of the load thread pitch line of the male element is slightly steeper than the slope of the load thread pitch line of the female element.

23 Claims, 2 Drawing Sheets (UNEQUAL, SLIGHTLY MISMATCHED GENTLY SLOPED TAPERS.)

(SAME SEALING SLOPE MISMATCH AS FOR FIG. 4A, BUT WITH THREAD INTERFERENCE LAGGING SEALING SURFACE INTERFERENCE.)

(SAME PARAMETERS AS FOR FIG. 4C, BUT WITH SLIGHT THREAD SLOPE MISMATCH.)

PIPE COUPLING

RELATED APPLICATIONS

This application is directed to an improvement of the pipe coupling/connection described and claimed in application Ser. No. 07/770,567 filed concurrently herewith, which application and this application are continuations-in-part of application Ser. No. 07/467,620 filed on 19 Jan., 1990, now abandoned.

This invention relates to couplings or connections for use in interconnecting lengths of pipe casing or tubing made of steel or the like. In the following description, both terms "coupling" and "connection" are used, usually interchangeably without preference, it being understood that the invention applies equally to threaded and coupled connections and to pin and box members integral with the pipe and interconnecting lengths of pipe.

BACKGROUND, PRIOR ART

The invention of application Ser. No. 07/770,567, filed concurrently herewith, is a pipe coupling/connection provided with a seal that simulates the seal one would obtain by shrink-fitting a cylindrical box seal onto a mating cylindrical pin seal, preferably modified by increasing the load pressure at the proximal end of the pin sealing surface by designing the coupling to provide, as the coupling is being assembled, sealing area interference at least about as soon as and preferably before there is any interference between the load threads of the pin and box in the vicinity of the sealing area. Preferably the load threads of the coupling have negatively inclined load flank faces.

SUMMARY OF THE INVENTION

The present invention is a pipe connection of the type having a female component (box) and a mating male component (pin), each matingly threaded for connection therebetween, and each provided with a sealing area adjacent the threaded area. The sealing area of the coupling components is formed by mating frusto-conical surfaces one on the pin and box. At least one and preferably both of these mating surfaces have controlled surface roughness formed e.g. by microgrooves. The respective sealing areas of the components are in axially aligned sealing engagement when the pipe connection has been assembled. The present invention is distinguished in one aspect by three principal characteristics, as follows:

(a) The slopes of the frusto-conical sealing surfaces are each relatively shallow. The term "shallow" is more fully explained below.

(b) The slope of the frusto-conical sealing surface of the male component is slightly less than that of the frusto-conical sealing surface of the female component. (This characteristic without more would result in a sealing bearing load relative to axial distance of the contacting sealing surfaces of the components, when the components have been assembled, simulating that of a pair of mating shrunk-fit circular cylindrical sealing surfaces. The analysis of this physical characteristic is set forth in copending application Ser. No. 07/770,567 incorporated herein by reference.)

(c) The slope of the load thread pitch line of the male component relative to the axis thereof is slightly steeper than the load thread pitch line of the female component relative to the axis thereof.

Preferably the mismatch between the slopes of the frusto-conical sealing surfaces of the male and female components is less than the nominal interference in inches at the gauge points of the said sealing surfaces.

Preferably the load flank faces of the load threads of both the male and female components are negatively inclined to the radial, the angle of negative inclination of the load flank faces not exceeding about 10 degrees.

Preferably the mismatch between male and female thread pitch line angle is less than that which would afford 50% contact between the distal threads of the male component and the mating threads of the female component.

Desirably, the female component is provided with an interior torque shoulder forming an annular seat whose face is negatively inclined to the radial, the seat being engageable by and mating with the distal end of the male component.

In another aspect, the pipe connection of the invention has frusto-conical sealing surfaces whose slopes are each relatively shallow, as stated above. Further, the slope of the load thread pitch line of the male component relative to the axis thereof is slightly steeper than the load thread pitch line of the female component relative to the axis thereof, also as stated above. In this second aspect, the pipe connection is further characterized as follows:

(1) When the connection is being assembled, interference between the sealing surfaces occurs before the occurrence of any radially-directed interference of the load threads of the male and female components in the vicinity of the sealing surfaces.

(2) Upon complete assembly of the connection, any interference between the load threads is sufficient to tend to pry the sealing surfaces apart to an extent that would reduce the sealing bearing load below the minimum design value for the connection.

Desirably the pipe connection has the characteristics of both the first and second aspects of the invention as stated above.

It is desirable to provide a relatively high sealing load pressure at the proximal end of the pin sealing surface when the coupling is assembled. Such high sealing load pressure tends to maintain a reliable seal notwithstanding thermal cycling of the pipe (repeated cyclic axial loading in compression and tension). The high sealing load pressure facilitates crushing of the solid particles in the preferred high-temperature graphite particle—containing lubricant used to coat the sealing surfaces, which promotes the establishment of a relatively impermeable seal. And the high sealing load pressure tends to flatten out peaks on the roughened sealing areas and burnish the sealing areas, which also promotes the establishment of an effective seal. Such flattening and burnishing occurs primarily during assembly of the coupling/connection, but may continue to some extent during thermal cycling, since there will be relative axial movement between pin and box sealing areas as the pipe is alternately stressed in compression and tension.

It is further desirable, as taught in the aforementioned application Ser. No. 07/770,567, to avoid interference between pin and box load threads in the vicinity of the sealing area before interference occurs between the pin and box sealing surfaces, as the coupling is being assembled.

According to the invention, both of the foregoing objectives are facilitated by providing a slight mismatch between pin and box load thread tapers, the pin taper being slightly steeper than the box taper.

(Note that this mismatch is in the opposite sense to the mismatch between sealing surface tapers disclosed in the aforementioned application Ser. No. 07/770,567).

The slight mismatch between pin and box load thread tends to ensure that root-to-crest contact does not occur at the threads in the vicinity of the seal such that the seal bearing load is compromised, and gives a degree of independence between axial loading and seal bearing pressure such that when axial loads are applied, the desired seal pressure distribution does not tend to be adversely affected. The increased bearing load at the proximal end of the effective pin sealing surface tends to ensure a seal that is acceptably tight even if there is damage to the distal end of the pin that interferes with the efficacy of the seal in the vicinity of the damage. Such increased bearing load also facilitates maintenance of adequate sealing pressure during thermal cycling of the pipe (alternating tension and compression of the coupling, which causes relative axial movement of the pin and box sealing surfaces).

The degree of mismatch between box and pin load thread tapers should be selected to be consistent with other coupling design objectives, including:

1. maintaining an adequate thickness of material at the distal end of the pin;
2. avoiding undue tilt of the distal end of the pin during make-up of the coupling (tilt resulting in strain that causes the yield strength of the steel to be exceeded is usually undesirable);
3. maintaining an adequate axial length of effective sealing area;
4. avoidance of galling of the sealing surfaces during make-up of the coupling;
5. maintaining the preferred box/pin sealing surface relationship, viz. a mismatch that simulates a circular cylindrical shrink-fit bearing load-vs.-distance characteristic; (this of course implies that there be no undue thread interference in the vicinity of the sealing area that would tend to part the box sealing surface from the pin sealing surface);
6. maintenance of an adequate seal during thermal cycling of the pipe, which causes cyclic relative axial movement between pin and box sealing surfaces.

The particular thread taper angles chosen may also depend in part on the pipe diameter, the grade of steel, the overall length of the pin sealing surface, the thread height, and the number of threads per axial length.

For most oil well pipe coupling applications, it is to be expected that the permitted maximum thread angle mismatch would result in the pin thread and box thread making only about 50% flank area contact at the distal end of the pin.

An advantage of the thread pitch line mismatch of the present invention is that the preferred bearing load vs. seal surface axial distance characteristic tends not to be adversely affected over the expected range of axial loading on the coupling.

Figure 1:
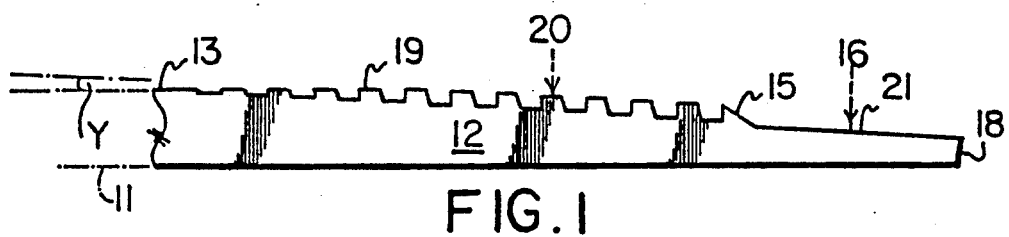
FIG. 1 is an axial partial section view of a pin member wall constructed in accordance with the invention, at the end of a length of pipe, as seen through the pipe wall, showing the coupling threaded portion and adjacent sealing portion for engaging a mating box member of the coupling.
Figure 2:
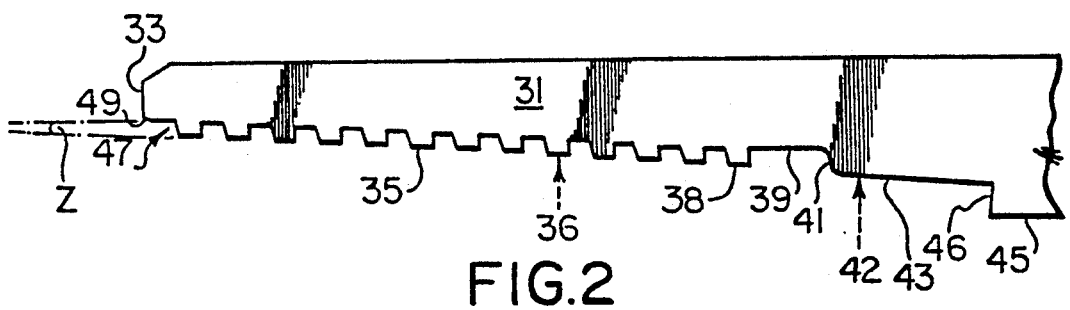
FIG. 2 is an axial partial section view of a wall portion of the mating female or box member of a coupling according to the invention showing the coupling threaded portion and sealing threaded portion for receiving the pin member of FIG. 1.

The orientation of the graphs of FIGS. 4A through 4D is the same as that of FIGS. 1 and 2, so that (referring to the pin) the distal end is to the right, and the proximal end to the left.

DETAILED DESCRIPTION OF THE INVENTION

The end of a steel pipe, tube or casing 11 is formed to provide a pin generally indicated as 12. Pin 12 has a threaded portion 19 beginning at a chamfered starting thread 15 located at a position short of the distal end 18 of the pipe 11 and extending axially therefrom to terminate in a vanish point 13. The relatively shallow thread pitch line of threaded portion 19 of the pin 12 is sloped inwardly from its proximal end at vanish point 13 toward its distal end. The pin 12 terminates in a frusto-conical sealing area 21 provided with a controlled surface finish to provide a limited degree of roughness, e.g. helical microgrooves formed by way of threading, as more particularly illustrated in FIG. 7. The angle of slope Y of the sealing surface 21 along the frusto-conical surface relative to the axis of the pin is equal to that of the thread pitch line of the threaded portion 19.

It will be noted that in FIG. 1, the depth of the roots, and the height of the crests of the threads of threaded portion 19 relative to the roots of the threads, of pin 12 increases from the vanish point 13 to a maximum about midway along the axial length of coupling portion 19, well before reaching the starting thread 15. As illustrated, seven of the threads are perfect threads. The thread relationships may be as described in the aforementioned patent application Ser. No. 07/770,567, subject to the mismatch to be described.

Referring to FIG. 2, the box 31 of which half of a complete wall length (in the axial direction) is illustrated in FIG. 2, is internally configured and threaded to mate with the pin 12 of FIG. 1. The other half of box 31 (not illustrated) is similarly internally configured and threaded to receive the pin of the next length of pipe. In an integral connection, the pin could be formed as illustrated in FIG. 1, the female end as illustrated in FIG. 2 (or FIG. 3, as an alternative to FIG. 2).

Specifically, the female coupling element 31 is provided beginning at its distal end 33 with a threaded portion generally indicated as 35 extending into the interior of box member 31 as far as a terminating thread 38. Further inwardly from thread 38 is a gap functioning as a single-point threading tool relief groove, generally indicated as 39, terminating in a shoulder 41 which defines the outermost limit of an interior frusto-conically shaped, microgroove sealing surface generally indicated as 43, which terminates in a limit or torque shoulder 45 forming a negatively inclined annular seat 46. The negative inclination of seat 46 tends to prevent the pin end 18 from climbing over the shoulder 45 when excess torque or high axial loading is applied to the coupling.

Although the threaded portion 35 of box 31 and the sealing surface 43 of box member 31 are both tapered so as to receive in coupling and sealing engagement the mating pin 12 of FIG. 1, nevertheless the degree of taper of the interior sealing surface 43 of box 31 is deliberately chosen to be slightly steeper than the degree of taper of the mating sealing surface 21 of pin 12. The reason for this is to provide a preferred bearing load-versus-length relationship, as discussed above and to be discussed in greater detail in the aforementioned patent application Ser. No. 07/770,567.

The individual threads 35 (load threads) of box 31, are angled to mate exactly with the threads of pin 12. Further, the thread pitch line of threads 35 is approximately that of threads 19, subject to the slight mismatch to be described. In other words, the surfaces of revolution of the thread pitch lines for the coupling threads of the male and female coupling components are or nearly mating frusto-conical surfaces. The box thread is typically deeper than the pin thread so as to afford the necessary thread clearance.

Figure 3:
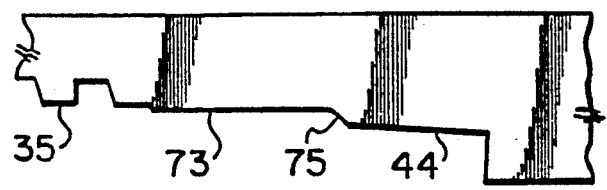
FIG. 3 is a partial view in axial section of a modified alternative construction of the wall portion of the box member modified to permit chaser manufacture of the box threads, and otherwise conforming to the box structure of FIG. 2.

FIG. 3 illustrates an alternative structure for the interior of the box member. In FIG. 2, the coupling threaded portion was shown to terminate in a final thread crest 38, followed by a thread relief groove 39, followed by a curved shoulder 41, and sealing surface 43. By contrast, the relief groove 39 is omitted in the FIG. 3 alternative embodiment, and instead, there is a thread run-off area 73 intermediate the end of the coupling threaded portion 35 and the sealing surface 44, merging with surface 44 via a curved shoulder transition portion 75. The sealing surface 44 of FIG. 3 is substantially identical to the sealing surface 43 of FIG. 2, with the qualification that the total axial distance occupied by the sealing surface 44 of FIG. 3 is somewhat shorter than the total axial distance occupied by the sealing surface 43 of FIG. 2.

While the FIG. 3 embodiment has less total sealing area than the FIG. 2 embodiment, nevertheless the FIG. 3 embodiment is easier to manufacture using a chaser technique, using the same tool bit (requiring no withdrawal of one tool bit and insertion of a separate tool bit). The sealing surface 44 can, using the chaser technique, be machined first as a helical microgroove surface, immediately followed by the machining of the threaded portion 35, without withdrawing the tool. The FIG. 2 embodiment does not admit of this possibility, but would require three separate tool bits to cut the threads, the thread relief groove, and the sealing area respectively, assuming that microgrooves are formed on the sealing area.

In this specification, reference will occasionally be made to the gauge point of the load threads and of the sealing surfaces of both pin and box. This is the point at which nominal design values are selected for whatever parameters pertain to such point. For example, the nominal interference value designed for the coupling is selected relative to the gauge points of the box and pin—the sealing surface gauge points for seal interference, the load thread gauge points for thread interference.

The selection of the gauge point is arbitrary to some extent, but ordinarily conveniently chosen as some intermediate point rather than a terminating point (of sealing surface, or threading, as the case may be). Suitably selected gauge points are shown schematically in FIGS. 1 and 2. Pin thread gauge point 20 is selected to be at or near the mid-point of the range of perfect threads on the pin. Box gauge point 36 is selected to be approximately aligned with pin gauge point 20 when the coupling is made up. Pin seal gauge point 16 is selected to be in the vicinity of the mid-point (axially) of the effective pin sealing surface. Box seal gauge point 42 is selected to be approximately aligned with pin seal gauge point 16 when the coupling is made up.

The difference between the coupling/connection of the present invention and that of the aforementioned patent application Ser. No. 07/770,567 is that the pin taper angle Y of the pin load threads relative to the axis of the pin is slightly steeper (greater) than the box taper angle Z of the box.

If, for example, the angle Y is of the order of 3.0 degrees, then the angle Z might be of the order of 2.7 degrees.

The mismatch should be chosen consistent with other design objectives of the sort mentioned earlier.

The mismatch should not be so great that a significant portion of the load threading is rendered inefficient. The greater the difference between the thread pitch line angles Y and Z, the greater the loss of contact between the distal pin threads and the mating box threads. The greater the loss of contact, the more threading that will be required to maintain the tensile yield strength of the coupling.

In most cases, it is not advisable to lose more than 50% of the distal pin thread contact (i.e., contact between the threading at the distal end 15 of such pin threading, and the mating box threading adjacent thread relief groove 39 or thread run-off area 73), as an upper limit of the permitted mismatch.

At the other extreme, where the angles Y and Z are almost identical, there is little or no improvement over the result obtained by practising the invention of the aforementioned patent application Ser. No. 07/770,567.

In use, the pin 12 of FIG. 1 is stabbed into the opening generally indicated as 47 of the box 31. Pin 12 is thrust in sufficiently far that contact is made between the starting thread 15 and the bevelled surface 49 at the receiving (distal) end 33 of box 31, following which engagement of the threaded portions 19, 35 of pin 12 and box 31 respectively begins. The box 31 is then rotated relative to pin member 12 or vice versa so as to screw the pin member 12 into the box member 31. Rotation of the box member 31 relative to pin member 12 continues until the limit of the threaded portions is reached and the coupling threaded portion 19 of pin member 12 fully engages the mating coupling threaded portion 35 of box member 31. Rotation is effectively terminated when distal end 18 of pin 12 comes into pressure contact with annular seat 46 of box 31. This contact, assuming that the distal end 18 of pin 12 matingly seats against torque shoulder 45 in annular seat 46, will tend to form an effective auxiliary seal when the coupling is under compression.

Before this point is reached, the sealing portion 21 of pin 12 will have commenced engagement with the mating (but slightly differently tapered, as mentioned above and discussed in further detail below) interior sealing surface 43 (or 44) of box 31. If the sealing areas are surface-roughened by microgroove machining, it is apparent that the pitch of the microgrooves on sealing surfaces 21, 43 of pin 12 and box 31 respectively must be very much smaller than the pitch of the threaded coupling portions 19, 35. It follows that the microgrooves on pin 12 will skip relative to the microgrooves of box 31, as the box 31 is screwed onto pin 12. This action generally will not damage the sealing surfaces 21, 43 appreciably, but will tend to smooth out any surface irregularities and will also, if a sealing compound has been applied to the sealing surfaces, tend to spread the sealing compound over the sealing surfaces and cause entrapment of the sealing compound by depressions in the mating sealing surfaces 21, 43 of the pin 12 and box 31 respectively so as to facilitate formation of a large effective sealing area as between the microgroove sealing surface 21 and microgroove sealing surface 43. The entrapment of sealing lubricant will serve to protect against wear and will reduce any propensity of the sealing areas to gall destructively.

According to the invention of the aforementioned patent application Ser. No. 07/770,567, the slopes of the tapered pin and box sealing surfaces are selected to be gently angled and slightly mismatched, as appears schematically in FIG. 4B. In that case, the bearing load varies with axial distance over the sealing area according to curve B1 in the graph of FIG. 4A. The bearing load is at a design minimum M at an intermediate point along the sealing threaded portions of the pin and box and rises to a significantly higher value at both ends of the sealing threaded portion of the pin and box.

Figure 4A:
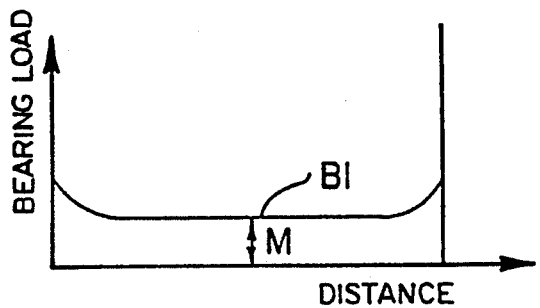
FIG. 4A is a graph showing a representative seal bearing load vs. distance characteristic for the seal of a coupling or connection designed according to the principles of the invention of the aforementioned patent application Ser. No. 07/770,567, where thread interference in the vicinity of the sealing area begins about simultaneously with seal surface interference, as the coupling is being made up, and where box thread taper is the same as pin thread taper.
Figure 4B:
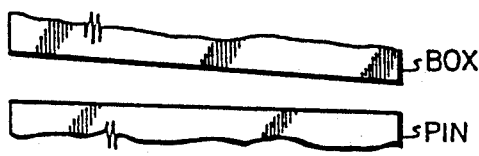
FIG. 4B schematically represents the slightly mismatched gently sloped tapers of box and pin sealing surfaces according to the invention, of the aforementioned patent application Ser. No. 07/770,567, giving rise to the graphs of FIGS. 4A, 4C and 4D. The dimensions, slopes and mutual spacing of the pin and box sealing areas have been exaggerated for ease of comprehension.
Figure 4C:
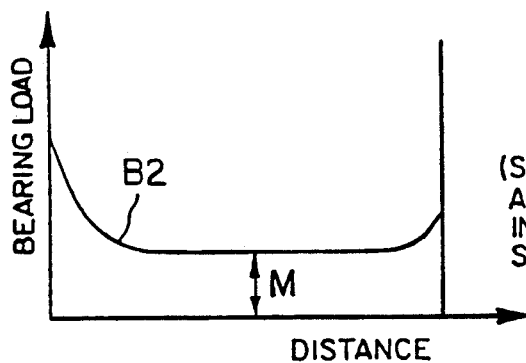
FIG. 4C is a graph showing a representative seal bearing load vs. distance characteristic for the seal of FIG. 4B, but where thread interference in the vicinity of the sealing area lags the occurrence of sealing area interference as the coupling is being made up.
Figure 4D:
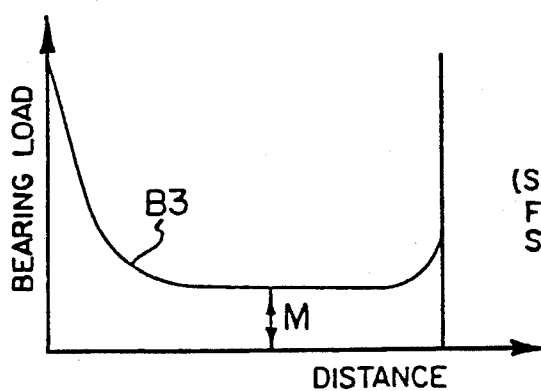
FIG. 4D is a graph showing a representative seal bearing load vs. distance characteristic for the seal of FIG. 4B as modified in the same way as for FIG. 4C, but with pin thread taper being slightly steeper than box thread taper, in accordance with the principles of the present invention.

It has been assumed in depicting the graph and physical arrangement of box and pin of FIGS. 4A, 4B that there is some thread interference in the vicinity of the sealing surfaces when the coupling is made up. If thread interference is deliberately designed to lag the occurrence of sealing surface interference by a considerable distance as the coupling is being made up, a superior result is obtained, viz. that of FIG. 4C. In that case, curve B2 is essentially similar to curve B1 over most of the axial distance along the sealing area, but curve B2 rises to a significantly higher bearing force value than does curve B1 in the vicinity of the proximal end of the sealing area relative to the pin. This extra measure of proximal-end sealing force tends to cause some burnishing of the sealing surfaces where that force is present and presumably facilitates mashing of sealing compound also.

It is not necessary, even when the coupling is completely made up, that there be any thread interference in the vicinity of the sealing area. In such case, proximal pin sealing surface bearing load considerably exceeds the bearing load that would result if adjacent thread interference were to lag sealing surface interference by only a slight delay during make-up ("delay" of course being used in a relative box/pin rotational movement sense, not in an absolute time sense).

If there is a slight mismatch between load thread and box thread taper, the pin thread taper being slightly steeper (more inclined to the axial) than the box thread taper, as taught in the present patent application, such that the thread taper mismatch facilitates the avoidance of thread interference in the vicinity of the sealing area, then the result is a further increase in the value of the bearing force (sealing force) at the proximal end of the sealing area relative to the pin. The result is graphically depicted in FIG. 4D.

Due regard must be paid to permitted tolerances in the chosen design of coupling according to the invention. Tolerances should be chosen for both sealing surfaces and load threads that tend to minimize risk of galling of the sealing surfaces during make-up of the coupling. On the other hand, tolerances should not be chosen that would make possible a reduction of bearing load throughout the effective sealing area below design minimum. The design minimum normally should be at least equal to the expected pressure differential at the yield strength of the selected steel.

More tolerance is permitted for higher grade steel than for lower grade steel. If the design minimum interference to hold pressure is, say, 0.010" and this could be achieved by a relatively low grade of steel such as J-55, then the maximum interference may be 0.020" as limited by galling. A higher grade of steel such as L-80 may be able to tolerate 0.030" because it will not tend to gall up to that amount of interference.

EXAMPLE

Pin and box members according to the foregoing description were prepared for use in couplings for 7-inch pipe having wall thickness ratings of 23 and 26 pounds per foot. Such a coupling is intended for use with well casings where steam injection within the casing is required. Depending upon the length of pipe and the expected pressures, a 55,000 psi minimum yield strength or 80,000 psi minimum yield strength steel may be selected. Temperatures up to 650 degrees Fahrenheit must be withstood, and axial tensile and compressive loads are expected to occur which approach or even exceed the actual yield strength of the material in the pipe body. The coupling was designed to withstand this axial loading without failure whilst maintaining adequate resistance to leakage from internal pressures ranging up to actual yield strength of the pipe wall.

The coupling was prepared with approximately twelve complete turns of threads tapered at 0.095 inches per inch for the pin and box, and having a pitch of 0.200 inches per revolution. Of the twelve threads on the pin, seven were perfect threads, and the other five were partial threads diminishing to the vanish point 13 as illustrated in FIG. 1. The flank face orientation for the pin threading was the same as that for the box threading, namely −3 degrees for the load flank and +18 degrees for the stab flank.

For the sealing surfaces, the microgrooves were formed by a 3/64 inch radius turning tool fed at an axial feed rate selected within the range of about 0.008 inches to 0.015 inches per revolution. (The lower rate facilitates leakage avoidance; the higher rate reduces manufacturing time). If the coupling will be used in a gaseous environment, such as a heavy oil steam environment, a feed rate nearer the lower value (0.008 inches/revolution) is preferred. For leak resistance in a conventional oil environment, a feed rate nearer the higher value (0.015 inches/revolution) is preferred. The total sealing length of the pin member was selected to be 0.900 inches; the sealing portion in the box member would be slightly smaller, depending upon whether the FIG. 2 or FIG. 3 embodiment is chosen. The microgrooves at the 0.008 inches/revolution pitch are about 0.0002 inch in depth and at 0.015 inches/revolution pitch are about 0.0006 inch deep. The crests tend to be flattened upon tightening the coupling, perhaps removing at least about 20% from the trough depth, and more in the vicinity of the area of highest bearing pressure.

The gauge points for the pin and box were selected as follows:

The pin and box thread gauge position was selected to be at a point axially where the threads in the made-up (assembled) position of pin and box members were directly coincident and spaced from the last full-depth thread (after which only partial flank depth occurs, diminishing towards the vanish point). This axial position was also selected so as to afford greater than zero interference at the ends of the threaded portions in the vicinity of the outer end of the box, less as one progresses inwardly (because of the load thread taper mismatch between box and pin).

The pin seal gauge point 16 was arbitrarily chosen to be ⅜ (0.375) inch from the distal end of the pin. The box seal gauge point 42 was also arbitrarily selected to be 0.375 inch from the box seat 46 (see FIG. 2). The calculated minimum interference M was then based upon the nominal interference (0.019 inch) at a location 0.375 inch from the distal end of the pin which coincides exactly with gauge point of the box seal. Selecting the gauge point is somewhat arbitrary on the basis that to stop leakage, the interference at any point along the active seal must be equal to or greater than the minimum seal interference (0.012" in this case). Since the coupling has unequal seal tapers for the pin and the box, in this case it is more convenient to locate the gauge points at the same axial location from the torque shoulder.

The pin sealing area taper was 0.104 inches per inch on diameter, the same as that of the thread pitch line of the threads, whilst the box sealing area taper was 0.110 inches per inch on diameter. This is a seal taper mismatch of 0.006 inches per inch on diameter, or less than the minimum gauge point sealing area interference of 0.012 inches on diameter. The tolerance of the pin thread and seal at the gauge point was ±0.004 inches on diameter, and that of the box was ±0.003 inches on diameter.

The box thread taper was selected to be 0.095 inches per inch, and the box seal gauge point 42 was selected to be 0.375 inch from the box seat 46.

There was no thread interference in the vicinity of the sealing area even when the coupling was made up. And as noted, there was slight mismatch between box and pin thread taper, the pin taper being slightly more inclined to the axis than the box taper, with the result that the sealing force vs. distance characteristic resembled that of FIG. 4D.

Terminology

The scope of the invention is as presented in the appended claims.

In the appended claims:

1. The term "connection" includes a coupling.
2. The phrase "relatively shallow" with reference to the slopes of the frusto-conical sealing surfaces of the box and pin implies that:
   (i) the taper is not so great as to give a bearing-load-vs.-axial-distance characteristic similar to that of FIG. 11A in the said copending patent application Ser. No. 07/770,567.
   (ii) the taper is not so great as to create a significant risk of loss of seal due to thermal cycling of the coupling (i.e., alternate stressing of the coupling in tension and compression);
   (iii) the taper is not so great as to reduce distal-end pin wall thickness unacceptably; and
   (iv) the taper is nevertheless sufficient to avoid galling of the sealing surfaces during assembly of the coupling.
3. The term "slightly less" with reference to the slope of the frusto-conical sealing surface of the pin relative to that of the box implies that:
   (i) the mismatch is sufficient to avoid a bearing-load-vs.-axial-distance characteristic similar to that of FIG. 10A in the said copending patent application Ser. No. 07/770,567;
   (ii) the mismatch is not so great as to generate an effective contacting sealing area between the box and the pin that is unduly short in the axial direction;
   (iii) the mismatch is not so great as to give a bearing-load-vs.-axial-distance characteristic similar to that of FIG. 12A in the said copending patent application Ser. No. 07/770,567 and
   (iv) the mismatch is not so great as to cause undue tilt of the pin during assembly.
4. The term "slightly steeper" with reference to the taper of the pin load threads relative to those of the box implies compliance with the design objectives set forth in this specification, and in particular implies choice of a mismatch that is less than that which would cause undue loss of thread contact between pin and box threads in the vicinity of the distal end of the pin.
5. In describing the inclination of the load flank faces of the load threads, the term "radial" implies an orientation perpendicular to the pipe axis.

What is claimed is:

1. A pipe connection of the type having a female component and a mating male component, each matingly threaded for connection therebetween, and each provided with a sealing area adjacent the threaded area, the sealing area of the coupling components being formed as mating frusto-conical surfaces, at least one of such surfaces having controlled surface roughness; the respective sealing areas of the components being in axially aligned sealing engagement when the pipe connection has been assembled; characterized in that:
   (a) the slopes of the frusto-conical sealing surfaces are each relatively shallow;
   (b) the slope of the frusto-conical sealing surface of the male component is selected to be slightly less than that of the frusto-conical sealing surface of the female component such that the sealing bearing load relative to axial distance of the contacting sealing surfaces of the components when the components have been assembled qualitatively simulates that of a pair of mating shrunk-fit circular cylindrical sealing surfaces; and (c) the slope of the load thread pitch line of the male component relative to the axis thereof is slightly steeper than the load thread pitch line of the female component relative to the axis thereof.

2. A pipe connection as defined in claim 1, wherein the load flank faces of the load threads of both the male and female components are negatively inclined to the radial.

3. A pipe connection of the type having a female component and a mating male component, each matingly threaded for connection therebetween, and each provided with a sealing area adjacent the threaded area, the sealing area of the coupling components being formed as mating frusto-conical surfaces, at least one of such surfaces having controlled surface roughness; the respective sealing areas of the components being in axially aligned sealing engagement when the pipe connection has been assembled; characterized in that:

(a) the slopes of the frusto-conical sealing surfaces are each relatively shallow;

(b) the slope of the frusto-conical sealing surface of the male component is slightly less than that of the frusto-conical sealing surface of the female component;

(c) the slope of the load thread pitch line of the male component relative to the axis thereof is slightly steeper than the load thread pitch line of the female component relative to the axis thereof; and (d) the mismatch between the slopes of the frusto-conical sealing surfaces of the male and female components is less than the nominal interference in inches at the gauge points of the said sealing surfaces.

4. A pipe connection as defined in claim 3, wherein the load flank faces of the load threads of both the male and female components are slightly negatively inclined to the radial, the angle of negative inclination of the load flank faces not exceeding about 10 degrees.

5. A pipe connection as defined in claim 4, wherein the mismatch between male and female thread pitch line angle is less than that which would afford 50% contact between the distal threads of the male component and the mating threads of the female component.

6. A pipe connection as defined in claim 3, wherein the female component is provided with an interior torque shoulder forming an annular seat engageable by and mating with the distal end of the male component.

7. A pipe connection as defined in claim 6, wherein the face of the annular seat is negatively inclined to the radial.

8. A pipe connection as defined in claim 3, wherein the slope of the frusto-conical sealing surface of the male component is substantially the same as the slope of the thread pitch line of the male component.

9. A pipe connection as defined in claim 3, wherein prior to assembly, to at least one of the sealing surfaces is applied a high-temperature high-solids sealing lubricant containing mashable solid particles.

10. A pipe connection of the type having a female component and a mating male component, each matingly threaded for connection therebetween, and each provided with a sealing area adjacent the threaded area, the sealing area of the coupling components being formed as mating frusto-conical surfaces, at least one of such surfaces having controlled surface roughness; the respective sealing areas of the components being in axially aligned sealing engagement when the pipe connection has been assembled; characterized in that:

(a) the slopes of the frusto-conical sealing surfaces are each relatively shallow;

(b) when the connection is being assembled, interference between the sealing surfaces occurs before the occurrence of any radially-directed interference of the load threads of the male and female components in the vicinity of the sealing surfaces;

(c) upon complete assembly of the connection, any interference between the load threads is insufficient to tend to pry the sealing surfaces apart to an extent that would reduce the sealing bearing load below the minimum design value for the connection; and (d) the slope of the load thread pitch line of the male component relative to the axis thereof is slightly steeper than the load thread pitch line of the female component relative to the axis thereof.

11. A pipe connection as defined in claim 10, wherein upon complete assembly of the connection, there is no thread interference creating a radial force between the said frusto-conical sealing surfaces.

12. A pipe connection of the type having a female component and a mating male component, each matingly threaded for connection therebetween, and each provide with a sealing area adjacent the threaded area, the sealing area of the coupling components being formed as mating frusto-conical surfaces, at least one of such surfaces having controlled surface roughness; the respective sealing areas of the components being in axially aligned sealing engagement when the pipe connection has been assembled; characterized in that:

(a) the slopes of the frusto-conical sealing surfaces are each relatively shallow;

(b) the slope of the frusto-conical sealing surface of the male component is selected to be slightly less than that of the frusto-conical sealing surface of the female component such that the sealing bearing load relative to axial distance of the contacting sealing surfaces of the components when the components have been assembled is characterized by a relatively uniform sealing force at least equal to a design minimum force throughout the axial length of the sealing area between the end regions of the sealing area, a distal sealing force peak at the distal end (relative to the male component) of the sealing area, and a proximal force peak at the proximal end (relative to the male component) of the sealing area, the proximal force peak being substantially higher than the distal force peak but less than the force at which deleterious galling of the sealing area occurs, and the distal force peak being substantially higher than the uniform sealing force between the end regions of the sealing area but less than the force at which deleterious galling of the sealing area occurs;

(c) when the connection is being assembled, interference between the sealing surfaces occurs before any occurrence of any radially-directed interference of the load threads of the male and female components in the vicinity of the sealing surfaces;

(d) upon complete assembly of the connection, any interference between the load threads is insufficient to tend to pry the sealing surfaces apart to an extent that would reduce the sealing bearing load below the minimum design value for the connection; and (e) the slope of the load thread pitch line of the male component relative to the axis thereof is slightly steeper than the load thread pitch line of the female component relative to the axis thereof.

13. A pipe connection as defined in claim 12, wherein upon complete assembly of the connection, there is no thread interference creating a radial force between the said frusto-conical sealing surfaces.

14. A pipe connection of the type having a female component and a mating male component, each matingly threaded for connection therebetween, and each provided with a sealing area adjacent the threaded area, the sealing area of the coupling components being formed as mating frusto-conical surfaces, at least one of such surfaces having controlled surface roughness; the respective sealing areas of the components being in axially aligned sealing engagement when the pipe connection has been assembled; characterized in that:
   (a) the slopes of the frusto-conical sealing surfaces are each relatively shallow;
   (b) the slope of the frusto-conical sealing surface of the male component is slightly less than that of the frusto-conical sealing surface of the female component;
   (c) when the connection is being assembled, interference between the sealing surfaces occurs before the occurrence of any radially-directed interference of the load threads of the male and female components in the vicinity of the sealing surfaces;
   (d) upon complete assembly of the connection, any interference between the load threads is insufficient to tend to pry the sealing surfaces apart to an extent that would reduce the sealing bearing load below the minimum design value for the connection;
   (e) the slope of the load thread pitch line of the male component relative to the axis thereof is slightly steeper than the load thread pitch line of the female component relative to the axis thereof; and
   (f) the mismatch in inches per inch between the slopes of the frusto-conical sealing surfaces of the male and female components is less than the nominal interference in inches at the gauge points of the said sealing surfaces.

15. A pipe connection as defined in claim 14, wherein the load flank faces of the load threads of both the male and female components are slightly negatively inclined to the radial, the angle of negative inclination of the load flank faces not exceeding about 10 degrees.

16. A pipe connection as defined in claim 15, wherein the slope of the frusto-conical sealing surface of the male component is substantially the same as the slope of the thread pitch line of the male component.

17. A pipe connection as defined in claim 14, wherein the mismatch between male and female thread pitch line angle is less than that which would afford 50% contact between the distal threads of the male component and the mating threads of the female component.

18. A pipe connection as defined in claim 17, wherein the female component is provided with an interior torque shoulder forming an annular seat engageable by and mating with the distal end of the male component.

19. A pipe connection as defined in claim 18, wherein the face of the annular seat is negatively inclined.

20. For use in a pipe connection of the type having a female component and a mating male component, each matingly threaded for connection therebetween, and each provided with a sealing area adjacent the threaded area, the sealing area of the coupling components being formed as mating frusto-conical surfaces, at least one of such surfaces having controlled surface roughness; the respective sealing areas of the components being in axially aligned sealing engagement when the pipe connection has been assembled; a female component of the foregoing type characterized in that:
   (a) the slopes of the frusto-conical sealing surfaces are each relatively shallow;
   (b) the slope of the frusto-conical sealing surface of the female component is selected to be slightly greater than that of the frusto-conical sealing surface of the male component such that the sealing bearing load relative to axial distance of the contacting sealing surfaces of the components when the components have been assembled qualitatively simulates that of a pair of mating shrunk-fit circular cylindrical sealing surfaces; and
   (c) the slope of the load thread pitch line of the female component relative to the axis thereof is slightly less steep than the load thread pitch line of the male component relative to the axis thereof.

21. For use in a pipe connection of the type having a female component and a mating male component, each matingly threaded for connection therebetween, and each provided with a sealing area adjacent the threaded area, the sealing area of the coupling components being formed as mating frusto-conical surfaces, at least one of such surfaces having controlled surface roughness; the respective sealing areas of the components being in axially aligned sealing engagement when the pipe connection has been assembled; a female component of the foregoing type characterized in that:
   (a) the slopes of the frusto-conical sealing surfaces are each relatively shallow;
   (b) when the connection is being assembled, interference between the sealing surfaces occurs before the occurrence of any radially-directed interference of the load threads of the male and female components in the vicinity of the sealing surfaces;
   (c) upon complete assembly of the connection, any interference between the load threads is insufficient to tend to pry the sealing surfaces apart to an extent that would reduce the sealing bearing load below the minimum design value for the connection; and
   (d) the slope of the load thread pitch line of the female component relative to the axis thereof is slightly less steep than the load thread itch line of the male component relative to the axis thereof.

22. For use in a pipe connection of the type having a female component and a mating male component, each matingly threaded for connection therebetween, and each provided with a sealing area adjacent the threaded area, the sealing area of the coupling components being formed as mating frusto-conical surfaces, at least one of such surfaces having controlled surface roughness; the respective sealing areas of the components being in axially aligned sealing engagement when the pipe connection has been assembled; a female component of the foregoing type characterized in that:
   (a) the slopes of the frusto-conical sealing surfaces are each relatively shallow;
   (b) the slope of the frusto-conical sealing surface of the female component is selected to be slightly greater than that of the frusto-conical sealing surface of the male component such that the sealing bearing load relative to axial distance of the contacting sealing surfaces of the components when the components have been assembled is characterized by a relatively uniform sealing force at least equal to a design minimum force throughout the axial length of the sealing area between the end regions of the sealing area, a distal sealing force peak at the distal end (relative to the male component) of the sealing area, and proximal force peak at the proximal end (relative to the male component) of the sealing area, the proximal force peak being substantially higher than the distal force peak but less than the force at which deleterious galling of the sealing area occurs, and the distal force peak being substantially higher than the uniform sealing force between the end regions of the sealing area but less than the force at which deleterious galling of the sealing area occurs;

(c) when the connection is being assembled, interference between the sealing surfaces occurs before any occurrence of any radially-directed interference of the load threads of the male and female components in the vicinity of the sealing surfaces;

(d) upon complete assembly of the connection, any interference between the load threads is insufficient to tend to pry the sealing surfaces apart to an extent that would reduce the sealing bearing load below the minimum design value for the connection; and (e) the slope of the load thread pitch line of the female component relative to the axis thereof is slightly less steep that the load thread pitch line of the male component relative to the axis thereof.

23. For use in a pipe connection of the type having a female component and a mating male component, each matingly threaded for connection therebetween, and each provided with a sealing area adjacent the threaded area, the sealing area of the coupling components being formed as mating frusto-conical surfaces, at least one of such surfaces having controlled surface roughness; the respective sealing areas of the components being in axially aligned sealing engagement when the pipe connection has been assembled; a female component of the foregoing type characterized in that:

(a) the slopes of the frusto-conical sealing surfaces are each relatively shallow;

(b) the slope of the frusto-conical sealing surface of the female component is slightly greater than that of the frusto-conical sealing surface of the male component;

(c) the slope of the load thread pitch line of the female component relative to the axis thereof is slightly less steep than the load thread pitch line of the male component relative to the axis thereof; and (d) the mismatch between the slopes of the frusto-conical sealing surfaces of the male and female components is less than the nominal interference in inches at the gauge points of the said sealing surfaces.

* * * * *

UNITED STATES PATENT AND TRADEMARK OFFICE
CERTIFICATE OF CORRECTION

PATENT NO. : 5,330,239
DATED : July 19, 1994
INVENTOR(S) : Thomas L. Blose, et al It is certified that error appears in the above-indentified patent and that said Letters Patent is hereby corrected as shown below:

Col. 3, line 6, after "thread" insert --tapers also--.

Col. 4, line 22, delete "," after --invention--.

Col. 6, line 67, change "the bevelled surface 49 at the receiving (distal) end 33" to --a contacting thread surface of the threaded portion 35--

Col. 7, line 67, delete "presumably".

Col. 8, line 10, before "load thread" insert --pin--.

Col. 12, line 26, change "provide" to --provided--.

Signed and Sealed this

Twenty-eight Day of March, 1995

Attest:

BRUCE LEHMAN

*Attesting Officer*     *Commissioner of Patents and Trademarks*